United States Patent [19]

Orzetti

[11] 3,716,943
[45] Feb. 20, 1973

[54] HUNTING CALL
[76] Inventor: Francis J. Orzetti, P.O. Box 95, Marvin Station, Wilcox, Pa. 15878
[22] Filed: Dec. 6, 1971
[21] Appl. No.: 205,036

[52] U.S. Cl. .................................................. 46/189
[51] Int. Cl. ................................................ A63h 5/00
[58] Field of Search .................................... 46/189

[56] References Cited

UNITED STATES PATENTS

| | | | |
|---|---|---|---|
| 3,208,184 | 9/1965 | Wisor | 46/189 |
| 2,643,483 | 6/1953 | Walker | 46/189 |
| 2,958,157 | 11/1960 | Tannehill | 46/189 X |

Primary Examiner—Louis G. Mancene
Assistant Examiner—Robert F. Cutting
Attorney—Alexander B. Blair

[57] ABSTRACT

A hunting call consisting of an elongate hollow generally cylindrical body formed of hard wood and having a dowel fixed to one end thereof and extending therethrough and exposed at the opposite end. A second hollow generally cylindrical body is also formed of hard wood and has a disc of barium ferrite embedded in one end thereof so that the exposed end of the pin can be drawn thereacross to produce the sound of a lost turkey. This sound is produced by drawing the letter C with the pin on the barium ferrite disc. To produce the sound of a squirrel relatively short squeeking strokes are made on the disc.

1 Claim, 7 Drawing Figures

PATENTED FEB 20 1973

3,716,943

INVENTOR.
FRANCIS J. ORZETTI
BY
Alexander R. Blair
ATTORNEY.

HUNTING CALL

BACKGROUND OF THE INVENTION

1. Field of Invention

The present invention relates to hunting calls to produce the sounds of certain game to help the hunter in attracting the game close enough for a shot.

2. Summary of the Invention

A hard wood hollow cylindrical body having a solid end formed thereon with a wooden pin extending therethrough. The pin projects outwardly of the opposite end of the body a short distance. A second generally cylindrical hard wood body is hollow and has a barium ferrite disc embedded in one end thereof. Movement of the pin across the disc creates the sounds of a turkey or a squirrel depending upon the manner of stroking the disc with the pin.

The primary object of the invention is to provide a turkey and squirrel call which can be varied in sound by varying the contact of the elements making the sound.

Other objects and advantages will become apparent in the following specification when considered in the light of the attached drawings.

DESCRIPTION OF THE PREFERRED EMBODIMENT

Figure 2:
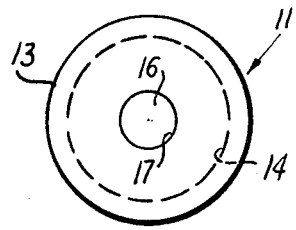
FIG. 2 is a top plan view of the invention.
Figure 3:
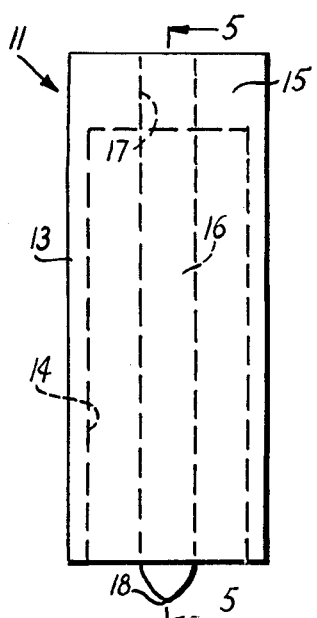
FIG. 3 is a side elevation of the sound and peg block.
Figure 5:
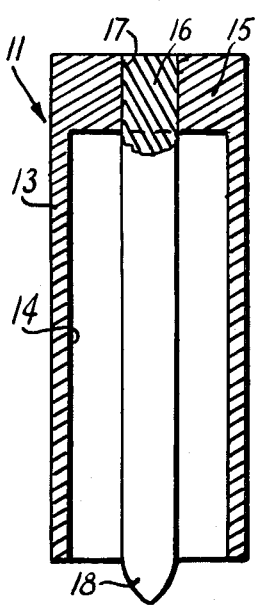
FIG. 5 is a vertical sectional view taken along the line 5—5 of FIG. 3 looking in the direction of the arrows.

Referring now to the drawings in detail wherein like reference characters indicate like parts throughout the several figures the reference numeral 10 indicates generally a hunter's call constructed in accordance with the invention.

The hunter's call 10 includes a sound and peg block generally indicated at 11 which is adapted to cooperate with a sound and disc block generally indicated at 12.

The sound the peg block 11 includes a generally cylindrical hard wood block 13 having a large bore 14 extending inwardly from one end terminating short of the opposite end to provide a relatively thick base 15.

A hard wood peg 16 is fitted into a bore 17 formed axially of the peg block 11 and extends axially through the bore 14 to extend beyond the end of the block 11. The peg 16 has a sharpened free end 18 for reasons to be assigned.

The sound and disc block 12 includes a generally cylindrical hard wood body 19 having a bore 20 extending therethrough. A groove 21 is formed in the body 19 adjacent one end of the bore 20 and a barium ferrite disc 22 is seated in the groove 21 at one end of the body 19 with its outer face exposed.

In the use and operation of the invention by right handed people the sound and disc block 12 is held in the left hand encompassed by the four fingers and with the barium ferrite disc 22 facing upwardly. The sound and peg block 11 is then held in the right hand as though it were a pencil and the sharpened end 18 of the peg 16 is scratched across the outer face of the barium ferrite disc 22 in the form of a letter C or straight across to produce the sound normally made by a lost turkey.

By using the same technique with shorter strokes a squeeking and scratching sound normally produced by squirrels can be produced by the hunter's call 10 of the instant invention.

Figure 1:
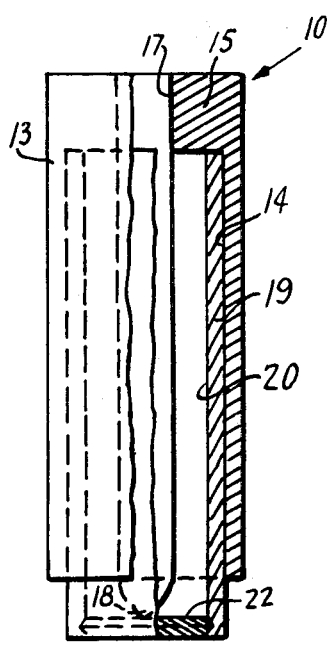
FIG. 1 is a side elevation of the invention shown partially broken away and in section for convenience of illustration.
Figure 4:
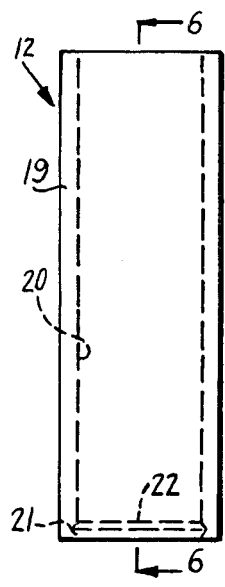
FIG. 4 is a side elevation of the sound and disc block.
Figure 6:
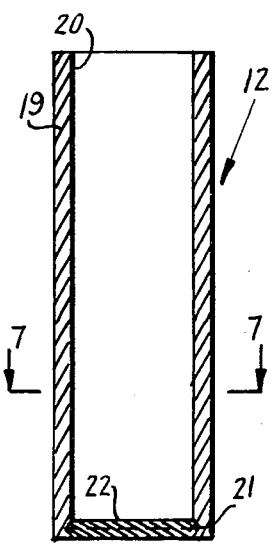
FIG. 6 is a vertical sectional view taken along the line 6—6 of FIG. 4 looking in the direction of the arrows.
Figure 7:
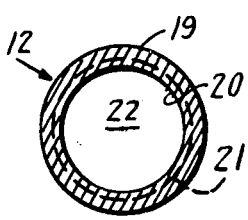
FIG. 7 is a transverse sectional view taken along the line 7—7 of FIG. 6 looking in the direction of the arrows.

The diameter of the bore 14 in the block 11 is slightly larger than the outside diameter of the block 12 so that the block 12 can be inserted into the bore 14 of the block 11 as can be seen in FIG. 1 to permit it to be carried in the pocket without requiring too much space.

Having thus described the preferred embodiment of the invention it should be understood that numerous structural modifications and adaptations may be resorted to without departing from the spirit of the invention.

I claim:

1. A hunter's call comprising a hollow tubular sounding block open at one end and closed at the opposite end, a hardwood peg rigidly secured to the closed end of said block and extending axially through said block projecting outwardly of the open end of said block, a sharpened point on the projecting end of said peg, a second hollow tubular sounding block adapted for telescopic mounting with said first named sounding block, an internal annular groove formed in said second sounding block adjacent one end thereof, a barium ferrite disc rigidly secured in said groove in said second sounding block whereby the scratching of said sharpened point of said peg across the barium ferrite disc will produce a call simulating the call of wild game.

* * * * *